July 12, 1966  R. W. HILTON  3,260,097
APPARATUS FOR EXPANDING TUBULAR MEMBERS
Filed April 8, 1963  3 Sheets-Sheet 1
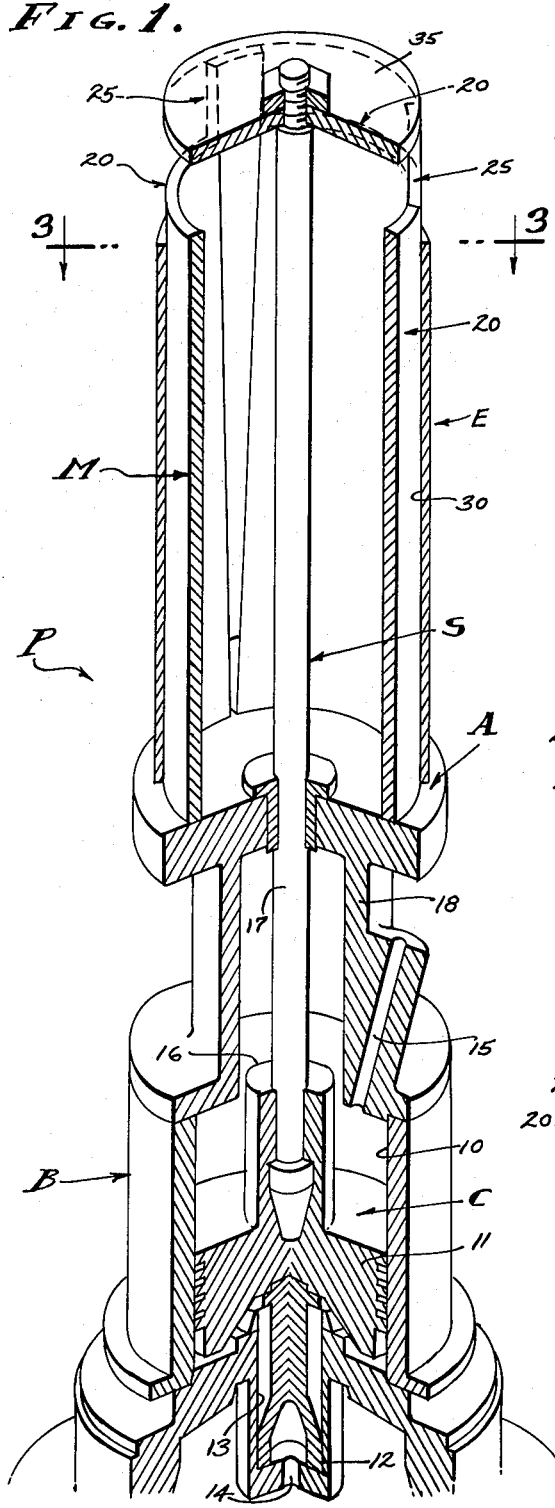
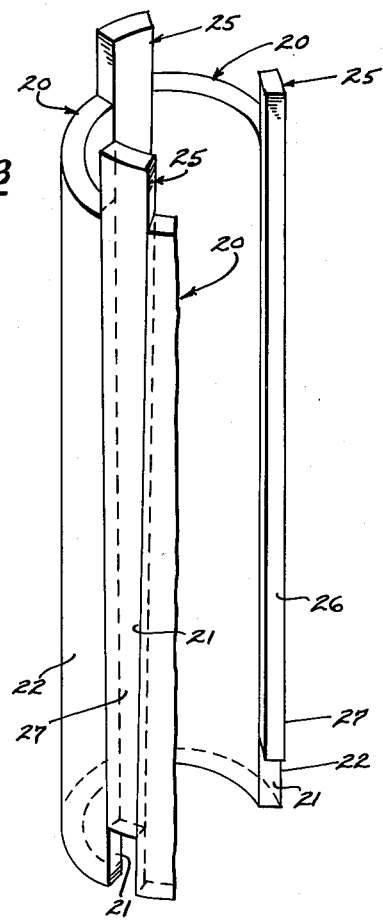
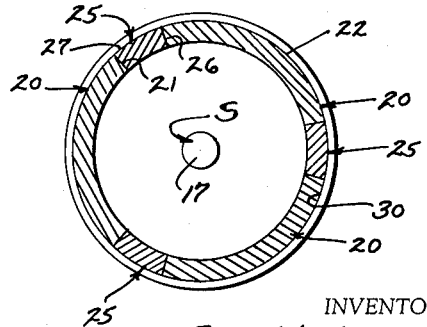
INVENTOR.
RALPH W. HILTON
BY
AGENT July 12, 1966   R. W. HILTON   3,260,097
APPARATUS FOR EXPANDING TUBULAR MEMBERS
Filed April 8, 1963   3 Sheets-Sheet 2

INVENTOR.
RALPH W. HILTON
BY
AGENT

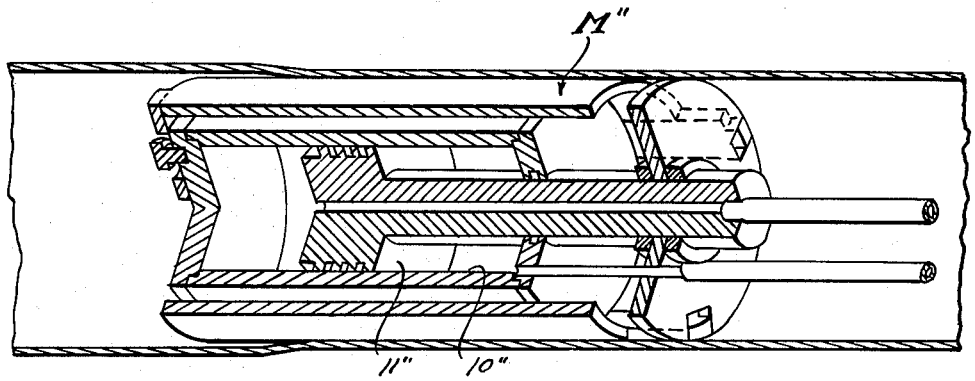
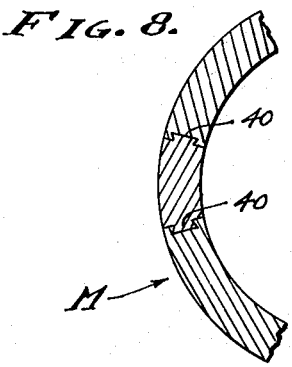
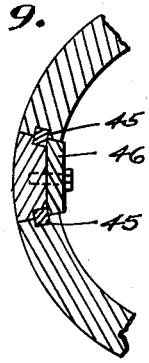
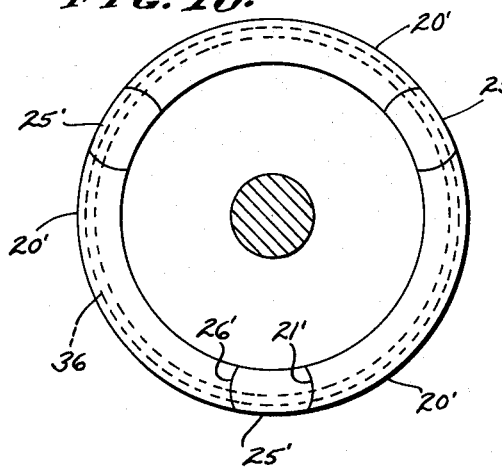
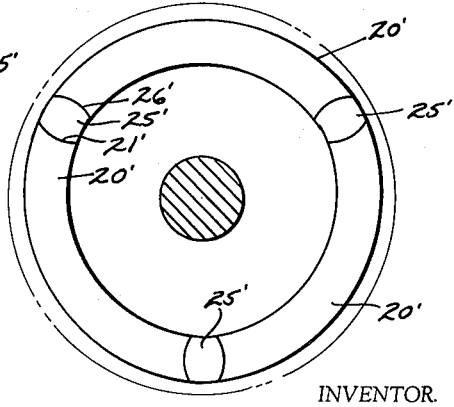

United States Patent Office 3,260,097
Patented July 12, 1966

3,260,097
APPARATUS FOR EXPANDING TUBULAR MEMBERS
Ralph W. Hilton, Palos Verdes Estates, Calif., assignor to Harvey Aluminum (Incorporated), Torrance, Calif., a corporation of California
Filed Apr. 8, 1963, Ser. No. 271,403
4 Claims. (Cl. 72—393)

This invention relates to metal working and is particularly concerned with the finishing to size of tubular members and particularly tubular members of substantial diameter and length, it being a general object of this invention to provide a new and improved stretching mandrel for use in a press, or as a press or the like, in order to elongate the material forming said members above the yield point and thereby straightening said members into the uniform and desired cross-sections.

Large diameter metallic extrusions require precise straightening and sizing, which is commonly accomplished by expanding the extrusion in presses. For instance, it is common practice to insert a press operated mandrel within the extrusions and to expand the same in order to elongate the metallic extrusion circumferentially. In practice, aluminum is stretched or elongated in this manner above the yield point of the metal in the range of 1% to 4% depending upon particular requirements. The controlled and measurable elongation is readily determined and the stretched metal will consistenly hold and retain the form or shape that it is stretched to, taking into account the spring-back that will occur. In practice, with known metals and with controlled environmental conditions the exact amount and speed of stretch is determinable for the expansion of extruded metal sections, tubular sections, in order to straighten them and size them to the desired contours and wall thicknesses.

Heretofore, expanders for the purpose above set forth have been characterized by segmental mandrels that are expansible within the extrusions so as to elongate the metal walls thereof circumferentially. This type of expander is ordinarily a large machine, the base of which stands approximately ten feet high, with a mandrel up to approximately six feet in diameter and up to approximately thirty feet in length or height. Size is an important factor of consideration since it is difficult to accurately control contours and wall thicknesses in large diameter extrusions.

A major deficiency in the common expander of the type under consideration is the lack of continuity in surface contour when the mandrel is expanded, due to the wedge-shaped mandrel sections that move radially outward with ever increasing space therebetween. The mandrel sections, or expander dies, are ordinarily shoe-like elements that fasten to an expansible core with no concern being given regarding continuity in outside contour of the mandrel sections, or expander dies, when in the fully expanded condition. The sections or dies simply move radially outward with gaps therebetween, said gaps extending longitudinally and co-extensively with the sections or dies. Even though relatively small, these gaps do exist to the end that the metal of the extrusion being elongated is stretched in straight lines between each separated section or die. As a result, a true cylinder or continuously curved contour cannot be formed and extrusions stretched on these common ordinary expanders are characterized by ridges, or lands and/or flats and with the end result that they are actually polygonal in cross-section. Needless to say, said ridges, or lands and/or flats are detrimental, especially in thin wall monocoque type structures, each imperfection presenting an initial bend and/or failure point.

An object of this invention is to provide an apparatus for maintaining precise continuity in the stretching of circumferential contours involved in tubular members. By use of the apparatus hereinafter disclosed imperfections such as ridges, or lands, and/or flats in tubular members are virtually eliminated.

Another object of this invention is to provide an expansible mandrel that has an outside contour of strict and uninterrupted continuity when in the expanded condition. Further, the said same mandrel also maintains its uninterrupted continuity in the collapsed condition with a slight change in contour or cross-section. However, the said contour is not critical when the mandrel is collapsed, the said contour becoming critical only when the mandrel is fully expanded.

It is still another object of this invention to provide an apparatus and mandrel of the type hereinabove referred to and which involves relatively movable parts which remain in true geometric relationship relative to each other and whereby proper bearing engagement is maintained at all times for the application of substantial force and pressure to the article or tubular member being expanded.

It is still another object of this invention to provide an apparatus and mandrel of the type hereinabove referred to and which permits relative movement between relatively movable sections of the mandrel and without materially affecting the bearing engagement therebetween and to the end that substantial pressure can be applied smoothly and without interruption for purposes of stretching tubular sections.

The various objects and features of this invention will be fully understood from the following detailed description of the typical preferred forms and applications thereof, through which description reference is made to the accompanying drawings, in which:

FIG. 1 is a vertically disposed perspective view of the expander apparatus embodying the present invention, being a view with a quarter section thereof broken away. FIG. 2 is a perspective view, with a quarter section removed, of a typical mandrel as it would appear when removed from the usual supporting apparatus that is shown in FIG. 1; and FIG. 3 is a sectional view taken substantially as indicated by line 3—3 on FIG. 1.

FIG. 7 illustrates a third form of apparatus wherein the apparatus is portable so as to be inserted into and passed through a tubular element to be stretched.

FIGS. 8 and 9 show modified forms of connection to be used between the sections of the mandrels of the three forms of invention that are shown.

FIGS. 10 and 11 are views similar to FIGS. 5 and 6 respectively, showing a further modification of the mandrel.

Figure 4:
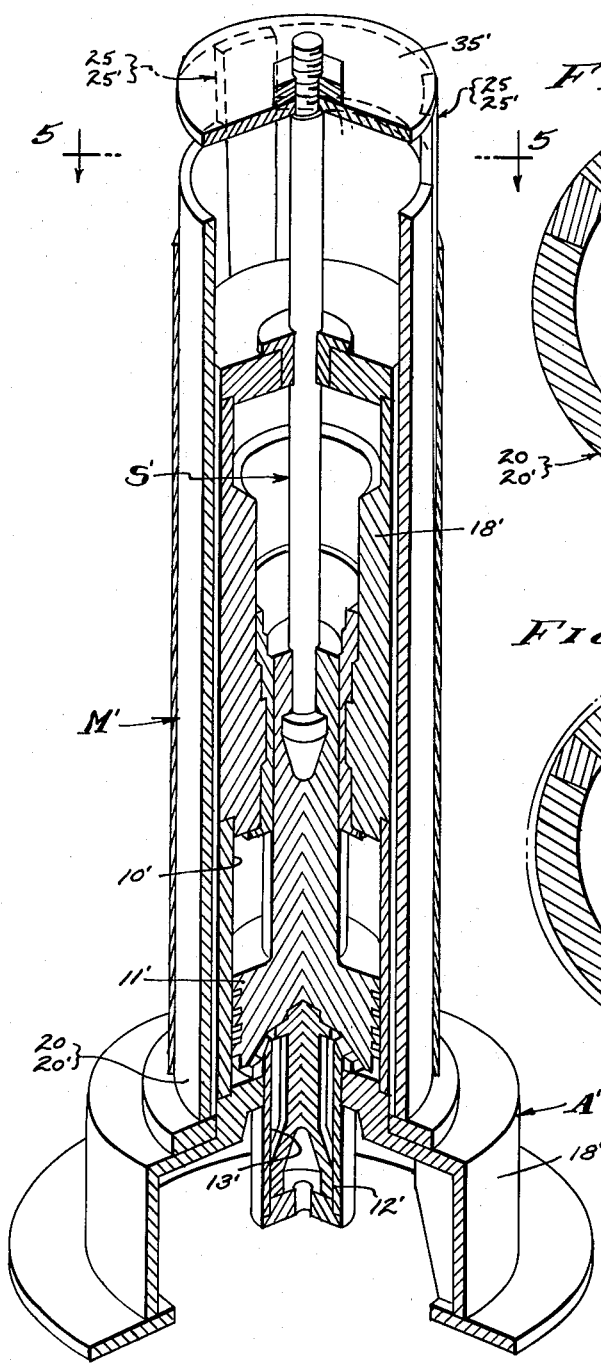
FIG. 4 illustrates a second form of apparatus wherein the operating means therefor is contained therein.
Figure 5:
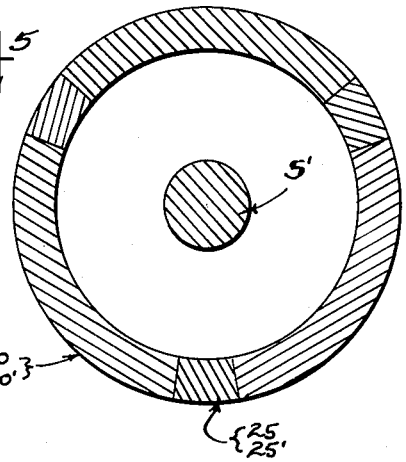
FIGS. 5 and 6 are sectional views of the mandrel, FIG. 5 being a section taken as indicated by line 5—5 on FIG. 4 with the mandrel in the expanded condition, and FIG. 6 showing the same mandrel in the contracted condition (phantom lines showing expanded condition).
Figure 6:
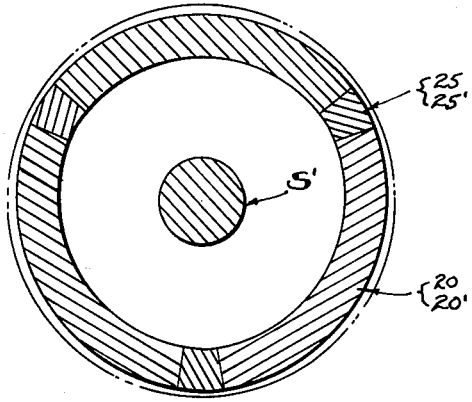

As stated above, a well developed method for straightening and sizing of large diameter tubular extrusions and the like has been practiced in the metal forming art. For example, in the production of large diameter thin walled aluminum extrusions the deformed and distorted extrusions are initially of undersize diameter and of oversize wall thickness as they issue from the extrusion press die. These initially extruded sections, of tubular form, for instance of hollow cylindrical form, are usually heat treated and are then placed over an expander mandrel which is operated to stretch slightly above the yield of the particular material involved. The mandrel expands radially in which case the stretch of material is circumferential, thereby enlarging the diameter of the extrusion and simultaneously reducing wall thickness thereof. The mandrel is expanded to a pre-determined size and upon release of pressure and/or collapse thereof the extrusion is released. Spring-back of the material forming the extrusion is predetermined and the expanded extrusion assumes a set formation, size and wall thickness, as a result of the stretching operation.

In FIG. 1 of the drawings I have shown a typical expander press P which involves a base B with a cylinder and piston means C that reciprocates a stem S relative to the base. The press P is shown as a vertically disposed unit, the axis of the means C and of the reciprocating stem S being vertical. At the top of the base B is the usual platform A for the support of objects to be operated upon by the press P. In this first form of the invention the mandrel M is applied to and carried by the press P to be supported on the platform A.

The base B is a vertically disposed cylinder element with a bore 10 slidably receiving a piston 11. The piston 11 is lifted by means of a ram 12 operating in a secondary cylinder 13 supplied with fluid pressure at 14. Expanding force is exerted by the piston 11 when fluid pressure is applied at 15 to force the piston downwardly in the cylinder bore 10. It is to be understood that this expander machine includes the usual and necessary features of construction, including a chuck or collet at 16 that joins the piston 11 through a rod 17 and to the stem S. As shown, the collet 16 operates within a housing 18 from which the stem S projects vertically from and on an axis normal to the plane of the platform A.

In accordance with the invention and in the first form thereof the mandrel M is an apparatus to be attached to and operated by the press P above described. Essentially, the mandrel M involves mating apposed sections or segments 20 and 25 that are complementary and which engage side by side at all times. Although the cross-sectional contours can be varied, for example the contour can be elliptical, a round cylindrical contour is the most common, in which case the mandrel M is barrel-shaped and the segments 20 and 25 are in the nature of staves. However, the characterizing feature of the present invention is that the segments 20 and 25 are longitudinally tapered so as to have circumferentially disposed edges 21 and 26 in wedged engagement with each other respectively. Further, the segments 20 and 25 are movable longitudinally relative to each other, whereby their wedged shapes cause expansion and/or contraction of the mandrel as a unit.

The stave-like segments 20 and 25 can be shaped and proportioned as circumstances require having outer walls 22 and 27, or contours, that present the outside contour that engages the inner wall 30 of the part or extrusion E to be expanded. As shown, the outer walls 22 and 27 continue one into the other to form a true contour, being a turned diameter when the segments 20 and 25 are in the fully expanded condition. The segments can be alike or identical and arranged in apposition to each other and alternately end for end, or as shown, the segments 20 can be supported by the platform A for radial movement only and the segments 25 can be moved by the stem S for both radial movement and also longitudinal movement relative to the first mentioned segments 20. In any case, there is relative longitudinal movement between the segmental elements (20 and 25), said movement being effected by the stem S reciprocated by the piston 11.

In carrying out the invention, the points of joinder between the apposed segments 20 and 25 are substantially radially disposed with the edges 21 and 26 to face circumferentially as specified. Thus, the segments being tapered longitudinally, they will move radially inward or outward when they are moved longitudinally relative to each other. In accordance with the invention the fully expanded position or condition is selected for the formation of the true and precise contouring of the mandrel M. That is, the mandrel M is fully expanded and maintained in said fully expanded condition while the true and precise contours 22 and 27 are imposed thereon. The particular mandrel M shown is turned when in said fully expanded condition.

With the mandrel M formed as hereinabove described the segments 20 are tapered so as to converge upwardly while the segments 25 are tapered so as to converge downwardly. Since the segments 20 are supported by the platform A, downward movement of the segments 25 causes expansion of the mandrel while upward movement will permit contraction thereof. Therefore, the stem S is provided with a header 35 that engages the segments 25 to force them downwardly when fluid pressure is applied to connection 15. Preferably, the header 35 engages the uppermost ends of the segments 25 to press them downwardly and also to lift them.

The joinder of or the retention of the segments 20 and 25 in position can vary and for instance the engagement or joinder between segments can be in radial planes, planes to engage flat when the mandrel is fully expanded. In this instance, the radial planes of joinder can be provided with dovetailed (see FIG. 8) or tongue and grooved (see FIG. 9) connections as shown; and in which case sufficient clearance is provided between all surfaces so as to permit limited articulation between the segments. Said clearance is necessary so as to permit articulation when the mandrel is collapsed from the fully expanded condition, it being significant that the contours 22 and 27 are imperfectly continuous only as and when the mandrel is collapsed from said fully expanded condition.

In FIGS. 10 and 11 I have shown a mandrel cross-section wherein substantially perfect bearing engagement is maintained between the segments 20' and 25' at all times. In this form, the segments 20' and 25' are articulately hinged about axes at or within one of the segments, preferably at or within the segments 25'. In accordance with this modification the segments 25' have frusto-cylindrical edge portions 26' as indicated, the said edge portions of the segments being turned to form convex bearing edges. In this modified form, the segments 20' are machined with concaved frusto-cylindrical edge portions 21' to conform with the frusto-cylindrical edge portions 26' of the segments 20', when said segments are in the fully expanded condition. It is recognized that when the segments are moved from the fully retracted to the fully expanded condition but slight angular movement is involved. As a practical matter, the 4% elongation required of the material to be stretched does not necessitate any great movement of the mechanical connections involved. For example, a mandrel of 4 feet diameter need have, for example, six complementary wedged segments each with a tapered 4° included angle and movable longitudinally relative to each other a distance of approximately but one foot.

The otherwise separable segments 20' and 25' of the modified mandrel can be retained together as by means of a constricting elastic member 36 or members 36, engaged around the periphery of the mandrel.

In FIG. 4 I have shown a second form of the present invention wherein the mandrel M' involves a self-contained actuating mechanism. As shown, the platform A' is the base per se with the cylinder 10' projecting vertically within the segments of the mandrel. The platform A' is of sufficient height to form a housing 18' to accommodate a ram 12' operating in a secondary cylinder 13' to lift the piston 11' that operates in the cylinder 10'. The segments 20 or 20' are supported on the platform A' and the stem S' projects centrally to a header 35' that shifts the segments 25 or 25' relative to the first segments. With this second form substantial weight and height reduction is realized without sacrificing function in any way whatsoever.

In FIG. 7 I have shown a third form of the present invention wherein the mandrel M" and the actuating mechanism above described in connection therewith is a self-contained portable unit disconnected from any base or supporting pedestal. As clearly shown in the drawings there are conditions where lengthy tubular extrusions, or the like, require stretching from within. Therefore, the mandrel M' (without a base) can be moved into said extrusion and progressively positioned therealong and successively expanded, so as to stretch one area or portion of the extrusion at a time. In FIG. 7 the actuating mechanism is further modified by the double acting feature of the cylinder 10" and piston 11", thereby eliminating the lifting ram previously described. It will be seen how the portable mandrel M' can be moved to successive positions longitudinally of the tubular element and said element stretched one portion at a time and in a uniform and progressive manner.

In FIG. 8 of the drawings the mandrel M is shown with sections joined by longitudinally disposed dovetails 40 having sufficient clearance, as above described, so as to permit limited articulation. The said dovetails 40 are engaged longitudinally and hold the sections of the mandrel against circumferential separation.

In FIG. 9 of the drawings the mandrel M is joined at tongue and grooved connections formed as by means of a spline 45 engaged in opposed grooves in the relatively movable sections. In the form illustrated there is a plate 46 applied to the smaller of the two sections, removable at the interior of the mandrel and so that the assembly can be conducted in a radial direction.

From the foregoing it will be apparent that the mandrel M and/or M' and modifications thereof, all as hereinabove described, presents an outside contour characterized by continuity and which is particularly adapted to stretch tubular metallic extrusions. The ordinary flats, ridges and/or imperfections which usually occur are virtually eliminated since there are no interruptions in the continuity of the mandrel contour. It will be apparent that the final and precise contour or cross-sectional configuration of the mandrel will occur when in the fully expanded condition, in which condition the tubular element being stretched gains its finalized corrected configuration.

Having described only a typical preferred form and application of my invention, I do not wish to be limited or restricted to the specific details herein set forth, but wish to reserve to myself any modifications or variations that may appear to those skilled in the art and fall within the scope of the following claims.

Having described my invention, I claim:

1. Apparatus for expanding tubular members about a central axis and comprising pairs of complementary longitudinally disposed wedge-shaped cylindrical sections, said sections having circumferentially and substantially radially disposed engaged edges for longitudinal sliding movement relative to each other, means at the engaged edges and joining the sections together circumferentially and against separation, and means to move the two sections of each pair of sections longitudinally relative to each other to vary the circumference of said combined sections by shifting the said sections radially.

2. Apparatus for expanding tubular members about a central axis and comprising pairs of complementary longitudinally disposed wedge-shaped cylindrical sections, said sections having circumferentially and substantially radially disposed engaged edges for longitudinal sliding movement relative to each other, articulation means at the engaged edges and joining the sections together with clearance to permit movement between adjoining sections and to hold the sections against circumferential separation, and means to move the two sections of each pair of sections longitudinally relative to each other to vary the circumference of said combined sections by shifting the said sections radially.

3. Apparatus for expanding tubular members about a central axis and comprising pairs of complementary longitudinally disposed wedge-shaped cylindrical sections, said sections having circumferentially and substantially radially disposed engaged edges for longitudinal sliding movement relative to each other, pivoted means joining the sections together at the engaged edges thereof, and means to move the two sets of sections longitudinally relative to each other to vary the circumference of said combined sections by shifting the said sections radially.

4. Apparatus for expanding tubular members about a central axis and comprising pairs of complementary longitudinally disposed wedge-shaped cylindrical sections, said sections having circumferentially and substantially radially disposed engaged edges for longitudinal sliding movement relative to each other, pivoted means comprising frusto-cylindrical opposing faces at the adjoining edges of the sections and joining the sections together in circumferential continuity, and means to move the two sets of sections longitudinally relative to each other to vary the circumference of said combined sections by shifting the said sections radially.

References Cited by the Examiner

UNITED STATES PATENTS

| | | | |
|---|---|---|---|
| 279,118 | 6/1883 | Allen | 113—48 |
| 498,433 | 5/1893 | Hart | 113—48 |
| 1,719,720 | 7/1929 | Olsen | 153—80 |
| 1,858,753 | 5/1932 | Taylor | 242—72.1 |
| 1,922,324 | 8/1933 | Price et al. | 113—103 |
| 1,980,419 | 11/1934 | Martin et al. | 113—103 |

CHARLES W. LANHAM, *Primary Examiner.*

R. J. HERBST, *Assistant Examiner.*